US008624907B2

(12) United States Patent
Wickstrom et al.

(10) Patent No.: US 8,624,907 B2
(45) Date of Patent: Jan. 7, 2014

(54) GRAPHICS ANALYSIS TECHNIQUES

(75) Inventors: Lawrence Wickstrom, Portland, OR (US); Christopher J. Cormack, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 12/459,265

(22) Filed: Jun. 26, 2009

(65) Prior Publication Data

US 2010/0328324 A1 Dec. 30, 2010

(51) Int. Cl.
*G06T 1/00* (2006.01)
*G06T 1/60* (2006.01)

(52) U.S. Cl.
USPC ............ 345/522; 345/501; 345/520; 345/581

(58) Field of Classification Search
USPC .................................. 345/501, 520, 522, 581
See application file for complete search history.

(56) References Cited

U.S. PATENT DOCUMENTS

| | | | |
|---|---|---|---|
| 6,594,387 B1 * | 7/2003 | Pettitt et al. ................... | 382/167 |
| 6,891,533 B1 | 5/2005 | Alcorn et al. | |
| 7,095,416 B1 * | 8/2006 | Johns et al. ................... | 345/522 |
| 7,660,015 B2 * | 2/2010 | Kagawa et al. ................ | 358/1.9 |
| 2005/0134605 A1 | 6/2005 | Hoppe et al. | |
| 2005/0195198 A1 | 9/2005 | Anderson et al. | |
| 2007/0242085 A1 * | 10/2007 | Weybrew et al. ............. | 345/629 |
| 2008/0007563 A1 | 1/2008 | Aronson et al. | |
| 2008/0034311 A1 | 2/2008 | Aguaviva et al. | |
| 2008/0141131 A1 * | 6/2008 | Cerny et al. ................... | 715/716 |
| 2009/0037774 A1 | 2/2009 | Rideout et al. | |
| 2010/0289809 A1 * | 11/2010 | Fenney ......................... | 345/581 |

FOREIGN PATENT DOCUMENTS

| | | |
|---|---|---|
| JP | 10-021122 | 1/1998 |
| JP | 2008-123488 | 5/2008 |
| JP | 2009-020610 | 1/2009 |
| JP | 2009-070371 | 4/2009 |

OTHER PUBLICATIONS

Plus Search Results for U.S. Appl. No. 12/459,267, Searched Thu Apr. 21, 15:10:51 EDT 2011, 2 pages.
Examination Report, GB Patent No. 1007881.4, Nov. 24, 2011, www.ipo.gov.uk, 3 Pages.
"Intel Graphics Performance Analyzer 2.0", iXBT Labs: Computer Hardware in Detail, http://web.archive.org/web/20090428105725/http://ixbtlabs.com/articles3/video/gpa-p., Nov. 2011.

(Continued)

*Primary Examiner* — Xiao M. Wu
*Assistant Examiner* — Todd Buttram
(74) *Attorney, Agent, or Firm* — Blakely, Sokoloff, Taylor & Zafman LLP

(57) ABSTRACT

Embodiments provide techniques for the analysis of graphics applications. For instance, an apparatus may include a graphics application program interface (API), a graphics engine, and a graphics analysis tool. The graphics analysis tool may receive multiple draw calls issued to the graphics API, and arrange the draw calls into multiple sequences, each sequence corresponding to a particular render target. From this information various analysis tasks may be performed. For instance, overdraw images may be generated. Such overdraw images may be enhanced to improve their dynamic range. Also, pixel histories may be generated based on corresponding pixel selections. The effect of draw calls on selected pixels may also be determined. Further, such tasks may be performed on a per render target basis.

18 Claims, 10 Drawing Sheets

(56) References Cited

OTHER PUBLICATIONS

"Intel Graphics Performance Analyzer 2.0", iXBT Labs:Computer Hardware in Detail, http://web.archive.org/web/20090428105701/http:/ixbtlabs.com/articles3/video/gpa-p., Nov. 2011.

"Intel Graphics Performance Analyzer 2.0", iXBT Labs:Computer Hardware in Detail, http://ixbtlabs.com/articles3/video/gpa-p1.html, Jul. 29, 2010.

"Intel Graphics Performance Analyzer 2.0", iXBT Labs:Computer Hardware in Detail, http://ixbtlabs.com/articles3/video/gpa-p2.html, Jul. 29, 2010.

"Intel Graphics Performance Analyzer 2.0", iXBT Labs:Computer Hardware in Detail, http://ixbtlabs.com/articles3/video/gpa-p3.html, Jul. 29, 2010.

* cited by examiner

GRAPHICS ANALYSIS TECHNIQUES

BACKGROUND

The graphics employed by computer applications are becoming increasingly complex. For example, gaming applications commonly provide three-dimensional graphics that are animated on a real-time basis. Such graphics continue to become progressively more realistic.

As the intricacy of such graphics increases, so does the challenge for application developers. For instance, developers must debug graphics renderings that do not operate or appear correctly. Also, developers must deal with limited processing capacities. Therefore, the processing loads imposed by graphics renderings need to be analyzed and often improved to fit within such limited capacities.

Tools to test, analyze, and debug graphics are important for the development of graphics applications.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques for the analysis of graphics applications. For instance, an apparatus may include a graphics application program interface (API), a graphics engine, and a graphics analysis tool. The graphics analysis tool may receive multiple draw calls issued to the graphics API, and arrange the draw calls into multiple sequences, each sequence corresponding to a particular render target. From this information various analysis tasks may be performed. For instance, overdraw images may be generated. Also, pixel histories may be generated based on corresponding pixel selections. Further, the effect of draw calls on selected pixels may also be determined. Moreover, such tasks may be performed on a per render target basis.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
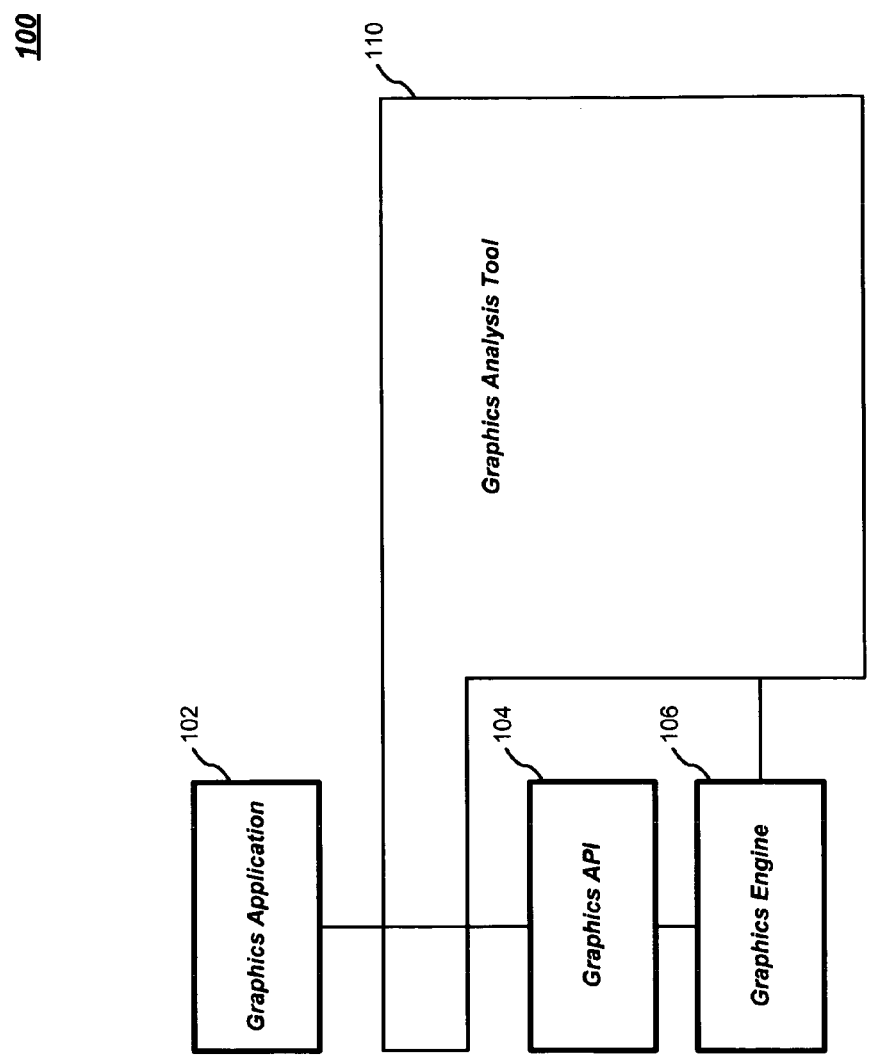
FIG. 1 is a diagram of an exemplary operational environment.

FIG. 1 is a diagram of an exemplary operational environment 100, which may employ the techniques described herein. Environment 100 may include various elements. For instance, FIG. 1 shows environment 100 including a graphics application 102, a graphics application program interface (API) 104, a graphics engine 106, and a graphics analysis tool 110. These elements may be implemented in any combination of hardware and/or software. Moreover, embodiments are not limited to the elements of FIG. 1.

In embodiments, graphics application 102 is a computer application (e.g., a user application) that employs graphics (e.g., three-dimensional graphics) that are output on one or more displays. Exemplary user applications include (but are not limited to) video games and simulation tools.

Graphics API 104 provides graphics application 102 with services of graphics engine 106. In embodiments, this may be provided through various routines, data structures, object classes, and/or protocols. Such employments of graphics API 104 are referred to herein as "draw calls". Embodiments may employ (but are not limited to) commercially available APIs. Examples of such APIs include OpenGL, DirectX, and others.

In general operation, graphics application 102 may employ multiple render targets in the generation of graphics. A render target is a buffer (maintained by graphics engine 106) affected by drawing operations that graphics application 102 initiates through graphics API 104.

Multiple render targets may be employed in various ways. For instance, graphics application 102 may employ multiple render targets in which each render target corresponds to a particular effect. Exemplary effects include (but are not limited to) shadowing, fog, lighting, blurring associated with motion, and so forth. Additionally or alternatively, each of multiple render targets may correspond one or more rendered objects or primitives. Embodiments, however, are not limited to these exemplary uses of render targets.

Graphics engine 106 performs graphics operations for graphics application 102. As described above, such operations may be performed in response to draw calls received and processed through graphics API 104. Exemplary operations include rendering and outputting images (frames) to a display device. Thus, graphics engine 106 employs a graphics pipeline. As described above, graphics engine 106 may be implemented in any combination of hardware and/or software. Thus, in embodiments, graphics engine 106 includes a graphics processing unit (GPU).

FIG. 1 shows that graphics analysis tool 110 is coupled to both graphics API 104 and graphics engine 106. Graphics analysis tool 110 may perform operations involving the analysis of graphics applications. To do this, graphics analysis tool 110 may obtain draw calls made by graphics application 102. Based on such draw calls, graphics analysis tool 110 may utilize graphics engine 106 to generate operational information regarding the draw calls. Such information may include (but is not limited to) overdraw images and pixel histories.

Also, graphics analysis tool 110 may obtain (or capture) frames rendered by graphics engine 106. Also, graphics analysis tool 110 may obtain draw calls related to such captured frames. Moreover, graphics analysis tool 110 may control the rate at which frames corresponding to application 102 are generated. Through such control, frames may be stepped through at a desired pace. Such a pace may be established by a user.

Figure 2:
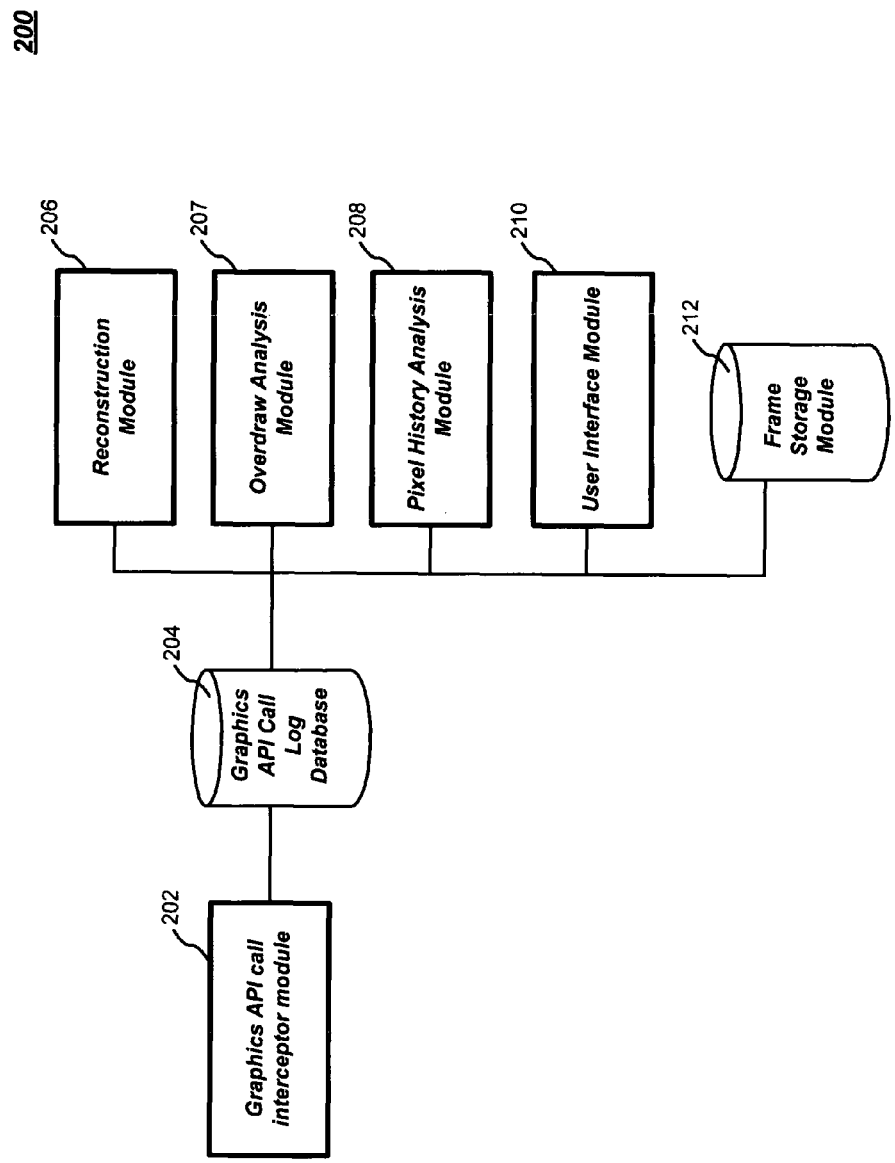
FIG. 2 is a diagram of an implementation that may be included in a graphics analysis tool.

As described above with reference to FIG. 1, graphics analysis tool 110 may perform operations involving the analysis of graphics applications. FIG. 2 is a diagram of an exemplary implementation 200 that may be included in graphics analysis tool 110. FIG. 2 shows implementation 200 including a graphics API interceptor module 202, a graphics API call log database 204, a reconstruction module 206, an overdraw analysis module 207, pixel history analysis module 208, a playback module 210, and a user interface module 212. These elements may be implemented in any combination of hardware and/or software.

Graphics API interceptor module 202 copies graphics API operations (referred to herein as draw calls) that a graphics application (such as graphics application 102) generates. Further, graphics API interceptor module 202 forwards the copied draw calls to graphics API call log database 204. In turn, graphics API call log database 204 stores these received draw calls.

Graphics API call log database 204 may store received draw calls in various ways. For example, graphics API call log database 204 may store draw calls chronologically. Further, such chronological storage may be arranged by draw calls for each of multiple render targets.

Reconstruction module 206 may generate various images (frames) based on draw calls stored in API call log database 204. Such reconstructions involve the employment of a graphics engine, such as graphics engine 106. Moreover, in generating such images, reconstruction module 206 may direct the graphics engine to employ certain settings. For example, setting may be altered so that render images indicate the number of particular events (e.g., overdraws) that occurred. Also, reconstruction module 206 may activate or deactivate various pipeline tests within the graphics engine.

Overdraw analysis module 207 determines (on a per render target basis) overdraws associated with particular draw calls. This may involve directing reconstruction module 206 to generate various overdraw images based selected (either user selected or automatically selected) draw calls and render targets. Exemplary operations regarding such features are described below with reference to FIG. 4.

Pixel history analysis module 208 determines a sequence of draw calls that cause a pixel to be written to ("touched"). This may involve directing reconstruction module 206 to generate particular images in accordance with various settings. Exemplary operations regarding such features are described below with reference to FIGS. 5, 6, and 7.

User interface module 210 provides for user interaction with graphics analysis tool 110. For instance, in embodiments, user interface module 210 provides a graphical user interface that provides for efficient user operation of the techniques described herein.

Frame storage module 212 stores one or more frames (images) generated by a graphics engine (e.g., graphics engine 106). These frames comprise multiple pixels corresponding to positions that may be output on a display device (not shown). The frames may be in various formats. Exemplary formats include (but are not limited to) various RGB and CMYK formats. Also, frame capture database 108 may employ various compression and or encoding schemes to store frame(s).

In embodiments, these frames may be generated in accordance with techniques described herein. For instance, frame storage module 212 may store frames generated through normal operation of application 102, graphics API 104, and graphics engine 106. Also, frame storage module 212 may store frames comprising overdraw image frames, pixel history frames, and other types of frames.

Figure 3:
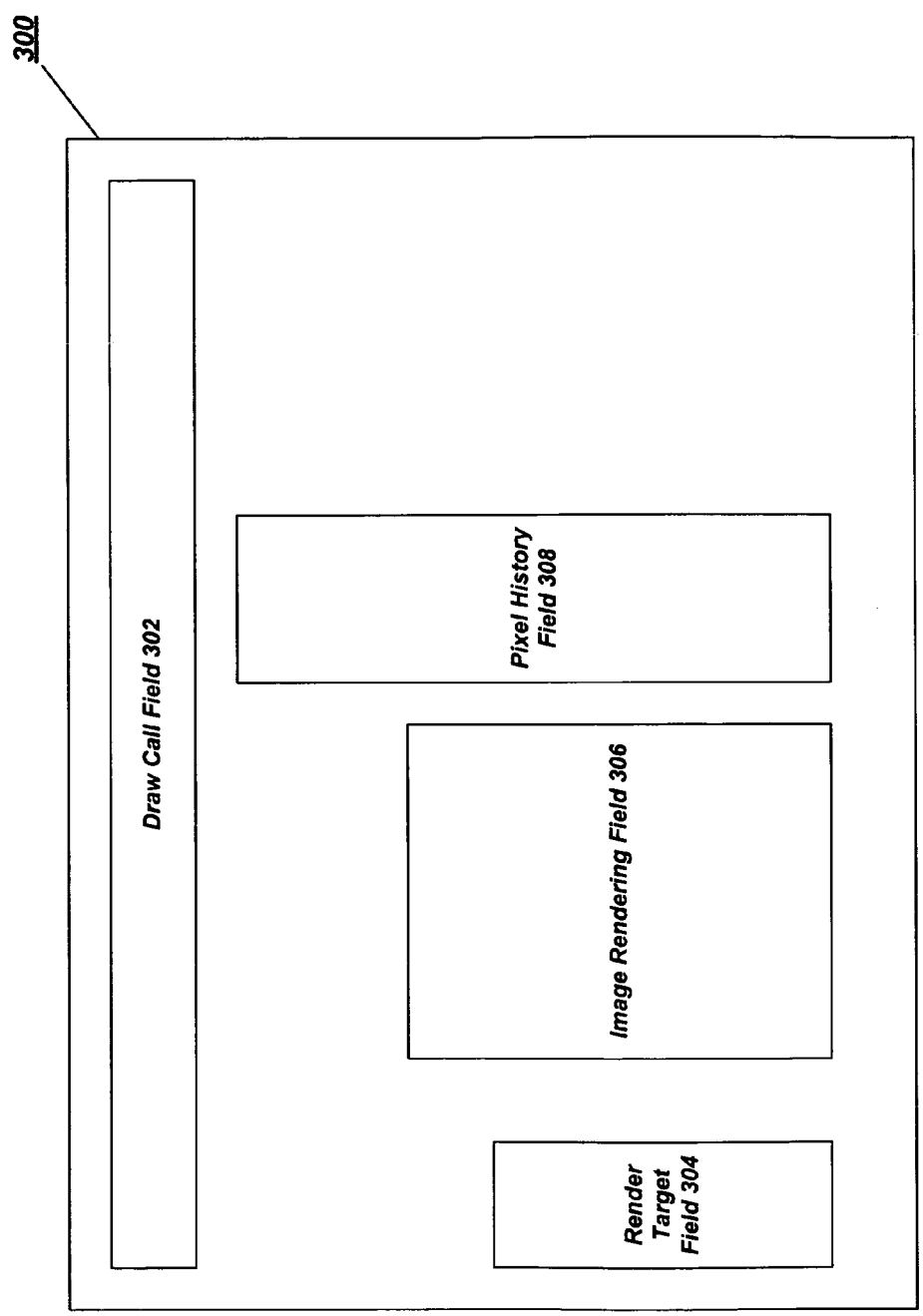
FIG. 3 is a diagram of an exemplary user interface.

Embodiments provide a user interface that displays graphics-related information to a user. FIG. 3 is a diagram of an exemplary user interface (also referred to as an interface console) 300. Interface console 300 allows for a user to view various information associated with graphics operations. As shown in FIG. 3, interface console 300 includes a draw call field 302, a render target field 304, an image rendering field 306, and a pixel history field 308.

Render target field 304 indicates multiple render targets associated with a particular image. In embodiments, such render targets may be indicated as icons or other graphical representations. A user may select a particular draw call through GUI interaction (e.g., by cursor positioning and double clicking).

In embodiments, draw call field 302 indicates draw calls (e.g., draw calls corresponding to a render target selected at field 304) in a chronological (e.g., from left to right) bar chart form. Thus, each bar corresponds to a particular draw call. Moreover, the height of each bar indicates the number of graphics engine operations (e.g., pipeline operations) caused by the corresponding draw call. In embodiments, a user may select a particular draw call through GUI interaction (e.g., by cursor positioning and double clicking).

Based on a selected draw call, the user may view an overdraw image in image rendering field 306. Features involving overdraw images are described below with reference to FIG. 4. From such overdraw images, the user may select a particular pixel for analysis. From such pixel selections, pixel history images may be displayed in image rendering field 306. Moreover, a corresponding pixel history of draw calls may be displayed in pixel history field 308. Exemplary details regarding pixel histories are provided below with reference to FIGS. 5-7.

Operations for various embodiments may be further described with reference to the following figures and accompanying examples. Some of the figures may include a logic flow. Although such figures presented herein may include a particular logic flow, it can be appreciated that the logic flow merely provides an example of how the general functionality described herein may be implemented. Further, the given logic flow does not necessarily have to be executed in the order presented unless otherwise indicated. In addition, the given logic flow may be implemented by a hardware element, a software element executed by one or more processors, or any combination thereof. Embodiments are not limited to this context.

Embodiments provide various techniques for analyzing graphics applications. Such techniques involve the analysis of overdraws, pixel histories, draw calls, and so forth. Further, such techniques may employ alternate image reconstructions and representations.

These alternate reconstructions and representations may advantageously allow performance-relevant information to be more quickly extracted from a graphics scene. An example of such alternate reconstructions and representations involves overdraw analysis being performed on a per render target basis. From this analysis, corresponding pixel histories may be generated. These features may advantageously provide for the extraction of otherwise hidden information from a sequence of graphics operations. An example involving such overdraw analysis and pixel history generation is described below with reference to FIG. 4.

Figure 4:
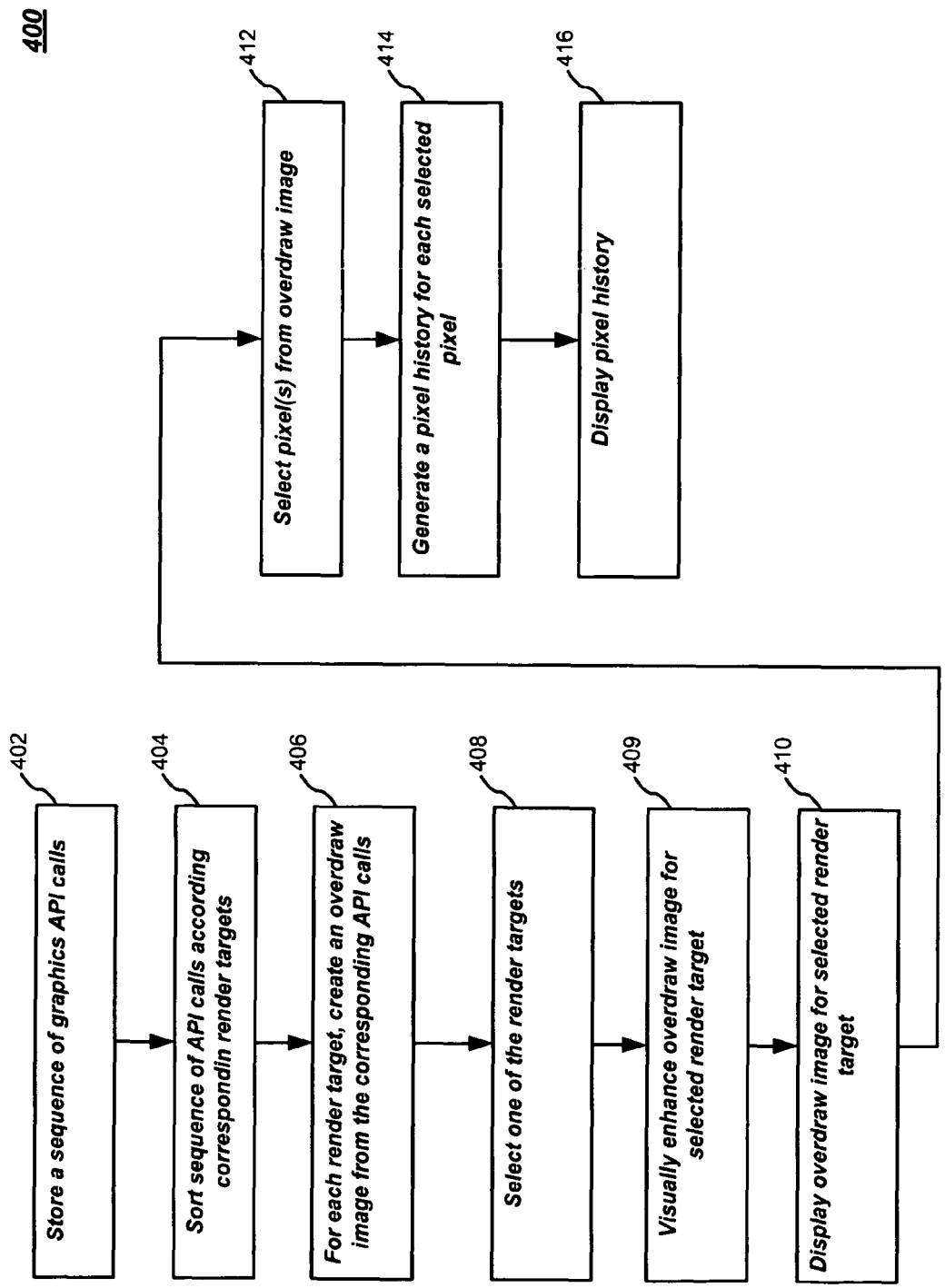
FIGS. 4-9 are logic flow diagrams.

FIG. 4 illustrates a logic flow 400, which may be representative of operations executed by one or more embodiments. This flow is described in the context of FIGS. 1 and 2. However, this flow may be employed in other contexts. Although FIG. 4 shows a particular sequence, other sequences may be employed. Also, the depicted operations may be performed in various parallel and/or sequential combinations.

At a block 402, a sequence of graphics API calls (draw calls) is stored. This sequence may correspond to a particular image (frame). In the context of FIG. 2, this may involve API interceptor module 202 intercepting these draw calls, and graphics API call log database 204 storing them.

At a block 404, the stored sequence of API calls is sorted into sequences for each of multiple render targets. With reference to FIG. 2, this may involve reconstruction module 206 determining render targets from each of the API calls. In embodiments, reconstruction module 206 may employ a graphics engine (e.g., graphics engine 106) to do this.

For each of these render target groups, an overdraw image is created at a block 406. Referring again to FIG. 2, this may involve reconstruction module 206 directing a graphics engine (e.g., graphics engine 106) to perform draw calls for each of the render targets. However, instead of operating normally, the graphics engine is configured in a way such that pixel values are accumulated. More particularly, the graphics engine may be configured so that draw calls cause corresponding render target pixel values to accumulate (incrementing a pixel hit count) each time they are written to ("touched"). Thus, in each render target, a count is generated for each pixel. This count indicates how many times the pixel was touched.

At a block 408, one of the render targets is selected. This selection may be by a user or automatic. In embodiments, this render target may be selected from a listing of multiple render targets provided on a display (e.g., as icons or other graphical representations).

At a block 409. The overdraw image for the selected render target may be visually enhanced. This enhancement may involve increasing the overdraw image's dynamic range. Details regarding such enhancements are described below with reference to FIG. 8.

At a block 410, the overdraw image is displayed for the selected render target. As described above, the overdraw images represent the number of times pixels have been touched. In embodiments, these numbers may be represented by pixel brightness in the displayed overdraw image. However, embodiments are not limited to this feature.

One or more corresponding pixels of this overdraw image may be selected at a block 412. This selection may be by a user or through automatic techniques. User selection may involve interacting with the overdraw image through a graphical user interface (GUI). For example, the user may select the pixel through a cursor, through graphical crosshairs, through the entry of numerical coordinates, and/or through other techniques. Alternatively, automatic selection may involve automatically selecting pixel(s) based on their overdraw values. For example, pixels indicating the highest number of touches may be automatically selected.

At a block 414, a pixel history for each of the one or more selected pixels is obtained for the user. The pixel history may comprise each draw call that affected (or caused a writing to) the pixel. In embodiments, these draw calls may be constrained to only those that affect the render target selected at block 408. However, embodiments may additionally or alternatively provide corresponding draw calls affecting other render targets.

This pixel history may be displayed at a block 416. In embodiments, this display may be in the form of a sequence of icons that each represent a draw call. A user may select (e.g., double click) on such an icon to view detailed information regarding the draw call. However, other techniques of displaying pixel histories (e.g., text listings) may be employed.

The flow of FIG. 4 advantageously provides a direct way to extract information from the most complex pixels in the scene. For example, from the overdraw image displayed at block 410, a pixel may be selected that has been touched a relatively large number of times (also referred to as a pixel having a high complexity). As indicated above, such pixels may be made apparent through their displayed brightness.

Upon selecting a pixel having high complexity, the user may view the API calls that affected the pixel (the pixel history). Additionally, the user may view a normal representation (not an overdraw representation) of the image. Through analyzing the draw calls, the user may determine whether a more efficient set of API calls can be made. Thus, through the identification of such pixels, developers may improve applications to reduce the number of times pixels are drawn. This may advantageously increase graphics application performance.

As described above, embodiments provide for the extraction of information regarding pixels. Also, embodiments may inform users about the number of times draw calls cause pixels to be touched. A single draw call can touch a particular pixel more than once. For instance, a draw call instructing a graphics engine (e.g., graphics engine 106) to render a three dimensional object may entail the graphics engine rendering surfaces that have overlapping pixel locations. As an example, a rendered cube may have overlapping front and back sides. Embodiments may (for a particular render target) detect and indicate each time a pixel was touched by a particular draw call. An example involving such features is described below with reference to FIG. 5.

Figure 5:
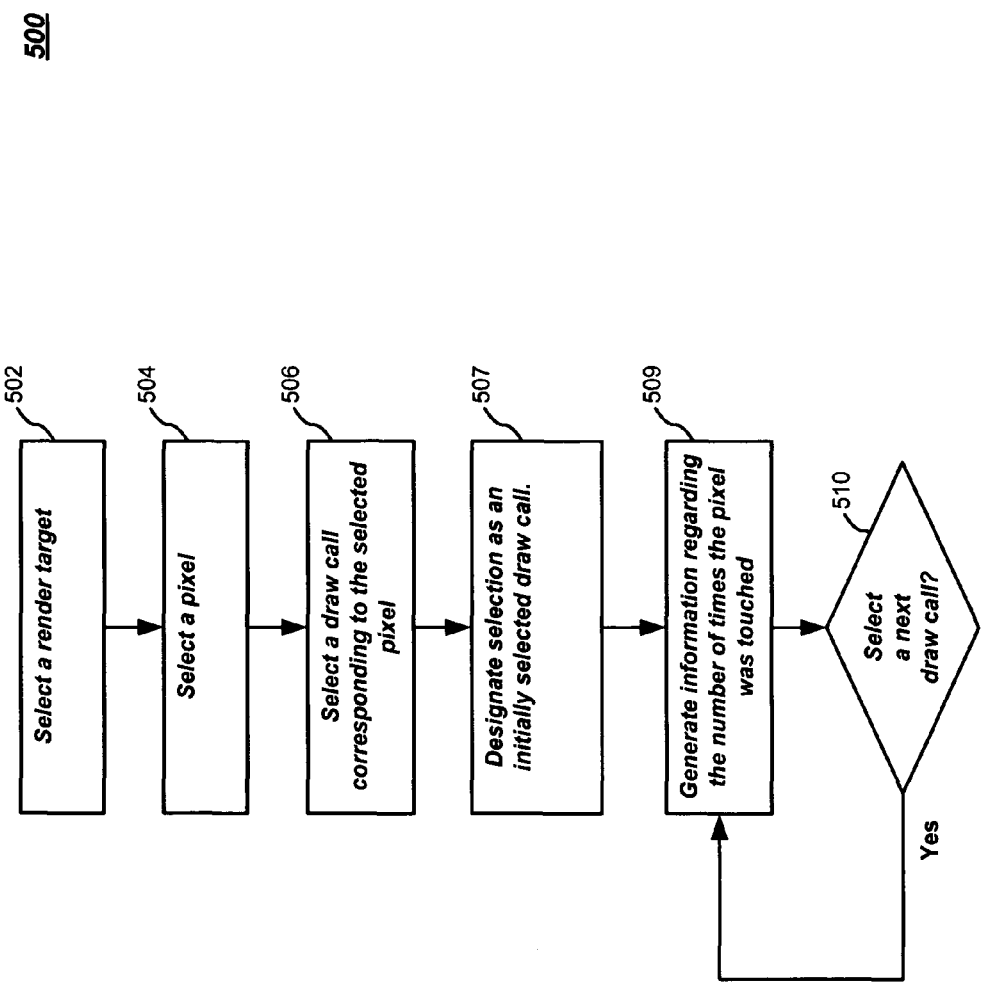

FIG. 5 illustrates a logic flow 500, which may be representative of operations executed by one or more embodiments. This flow is described in the context of FIGS. 1 and 2. However, this flow may be employed in other contexts. Although FIG. 5 shows a particular sequence, other sequences may be employed. Also, the depicted operations may be performed in various parallel and/or sequential combinations.

At a block 502, a render target is selected. This selection may be by a user. Alternatively, this selection may be automatic. Also, at a block 504, one or more pixels are selected This pixel may be selected in various ways. For example, this pixel may be user selected or automatically selected based overdraws, as described above with reference to FIG. 4. Embodiments, however, are not limited to this context.

At a block 506, the user selects a draw call corresponding to the selected pixel. For example, the user may select this draw call from multiple draw calls (e.g., a sequence of draw calls) identified in a pixel history, such as a pixel history generated at block 414 of FIG. 4. Accordingly, if this is the first selection in a sequence, embodiments may designate this as an initially selected draw call at a block 507.

At this point, information may be determined at a block 509 regarding the number of times the selected pixel (in the selected render target) was touched. In embodiments, this determination may be for selected draw call. Alternatively, this determination may be for a sequence of draw calls starting with the initial draw call designated at block 507 and ending with the draw call selected at block 506.

As shown in FIG. 5, such determinations may involve multiple passes. For example, a first pass may involve performing the draw call(s) without any graphics pipeline tests activated. Also, a second pass may involve the performing the draw call(s) with particular graphics pipeline tests activated. Further, a third pass may involve performing the draw call(s) with alpha blending. These three passes within block 509 are described for purposes of illustration, and not limitation. Accordingly, embodiments may employ other combinations of passes and/or other sequences. Further details regarding these passes are provided below with reference to FIG. 6.

At a block 510, a user may select a next draw call. This next draw call may be in a chronological sequence of draw calls that affect the selected pixel in the selected render target. For instance, this next draw call may be a draw call following the draw call that was most recently selected (either at block 506 or block 510). As shown in FIG. 5, if a next draw call is selected, then operation returns to block 509.

Thus, the features of FIG. 5 allow a user select one or more draw calls of interest, and analyze its (or their) impact on particular pixels. Such features advantageously allow a scene's complexity on any pixel of a particular render target to be evaluated. This information may advantageously assist users to decide whether to decrease the complexity of a particular scene or to modify application settings to increase the performance of particular 3D operations.

As described above, determinations regarding the number of times a selected pixel (in the selected render target) was touched may be performed in multiple passes. An example, of such multiple passes is provided by FIG. 6.

Figure 6:
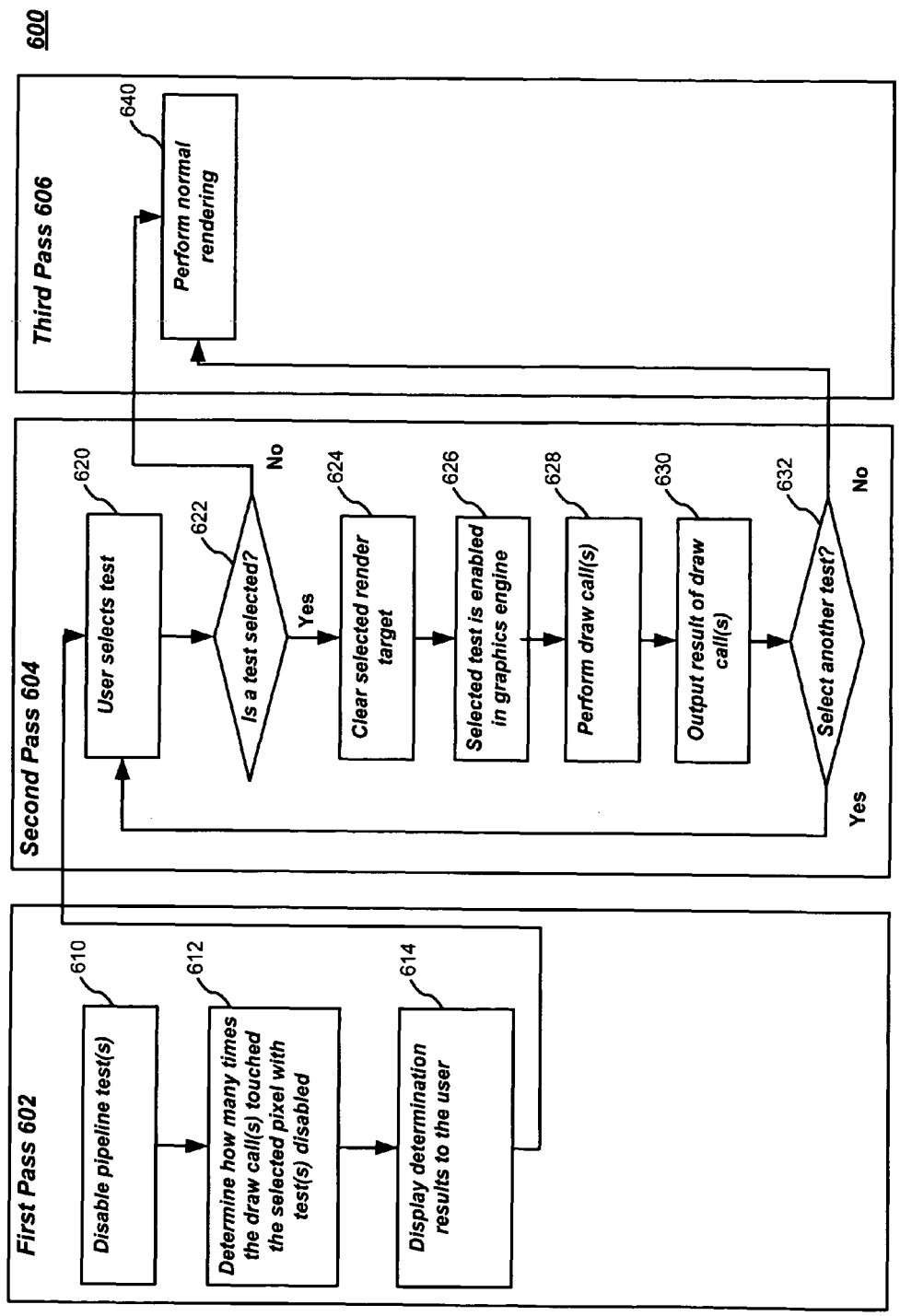

In particular, FIG. 6 is a flow diagram 600 that includes a first pass 602, a second pass 604, and a third pass 606. Each of these passes involves multiple operations. For instance, FIG. 6 shows first pass 602 including blocks 610-614. At block 610, particular graphics pipeline tests (e.g., scissor test, rectangle test, Z test, stencil test, and/or alpha test) are disabled. At a block 612, it is determined how many times the draw call(s) touched the selected pixel while these tests are disabled. This may involve performing the draw call(s) with unmodified rendering operations. For example, pixel shader code may be modified so that the selected pixel's shading is increased (e.g., incremented by one) each time the pixel is touched by the draw call. Embodiments, however, are not limited to this technique.

The results of this determination are output to the user at block 614. These results may be outputted graphical form (e.g., displayed at the selected pixel location as a corresponding brightness, shading, or transparency level). Alternatively, these results may be output in text form.

FIG. 6 shows second pass 604 including blocks 620-632. At block 620, the user may activate a particular test. For example, the user may activate a ranged scissor test, a z test, or a stencil test. At a block 622, it is determined whether a test was selected. If so, operation proceeds to block a 624. Otherwise, operation proceeds to a third pass at a block 640.

At block 624, the selected render target is cleared. Following this, the selected test is enabled in the graphics engine at a block 626. At a block 628, the draw call(s) are performed.

The results of these draw call(s) are output to the user at a block 630. These results may be outputted graphical form (e.g., displayed at the selected pixel location as a corresponding brightness or transparency level). Alternatively, these results may be output in text form. If the result is zero (no pixel value), this indicates that the selected test failed each time it was invoked. However, if the result is non-zero, then the selected test passed at least one of the times it was invoked.

As indicated by a block 632, the user may select another test. If so, then operation returns to block 620. Otherwise, operation proceeds to the third pass at block 640.

FIG. 6 shows the third pass including a block 640. At this block, a normal rendering is performed to determine the output color of the pixel.

Further to the flow of FIG. 6, various non-limiting illustrative examples are now provided regarding the number of times a pixel has been touched. For instance, the number of "touches" may be the number of times a rendered geometry intersects the pixel. For instance, when the geometry being rendered is a sphere containing two sided triangles, then the center pixels will have an overdraw count of two: once for front, once for back. (z-test is disabled in this case). Further, if the geometry being rendered is a sphere containing one sided triangles, then center pixels will have an overdraw count of one: once for front, zero for the back (since it was back-face culled. (culling enabled in this case)).

Moreover, the number of "touches" may be the number of times the pixel was actually written to the buffer (discarding the times that the geometry was z-test rejected). For instance, when rendering three triangles above each other from the viewer's perspective, the number of touches would depend upon the draw order. For example, if the furthest is drawn first, then the middle, and then the closest, then the count would be 3 for pixels in which all three triangles overlap. However, if the closest is drawn first, then the middle, and then the furthest, the count would be one for the same pixels. This is because the latter two would have been z-test rejected.

As described above, embodiments allow users to determine the effect of draw calls on particular pixels. Further, embodiments allow the disabling of draw calls. For example, a user may disable one or more draw calls and determine the impact of this disabling on pixel processing. Thus, computational differences may be determined. For example, it can be determined whether a scene rendering became faster. Also, the user can determine the visual impact of this disabling on the rendered image. For instance, a user may determine whether disabling the draw call(s) made the scene look unacceptable. An example involving such features is described below with reference to FIG. 7.

Figure 7:
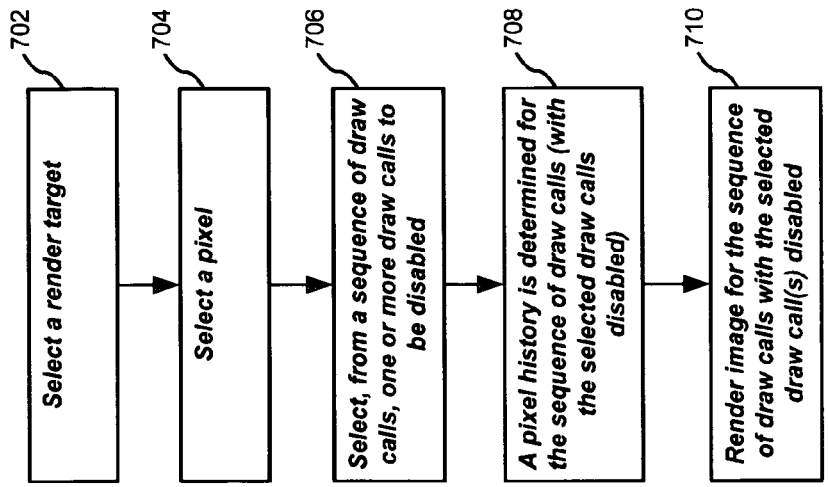

FIG. 7 illustrates a logic flow 700, which may be representative of operations executed by one or more embodiments. This flow is described in the context of FIGS. 1 and 2. However, this flow may be employed in other contexts. Although FIG. 7 shows a particular sequence, other sequences may be employed. Also, the depicted operations may be performed in various parallel and/or sequential combinations.

As shown in FIG. 7, a render target is selected at a block 702. This selection may be by a user or through automatic techniques. Also, at a block 704, a pixel is selected. This pixel may be selected in various ways. For example, the pixel may be user selected or automatically selected, as described above with reference to FIG. 4. Embodiments, however, are not limited to this context.

A user selects one or more draw calls to be disabled at a block 706. This selection may be from a sequence of draw calls. At a block 708, pixel history is determined for the sequence of draw calls. In embodiments, this may involve performing operations described above with reference to FIG. 5. Thus, the number of times a pixel was touched with the disabled draw call(s) may be determined. As described above with reference to FIG. 5, such determinations may be made with various graphics pipeline test(s) (e.g., scissor test, rectangle test, Z test, stencil test, and/or alpha test) activated or deactivated. Because the disabled draw call(s) are not rendered, such tests for subsequent draw calls may have different test outcomes. Thus, disabling draw calls provides a dynamic pixel history.

At a block 710, an image is rendered for the sequence of draw calls with the selected draw call(s) disabled. This rendered image is displayed to the user at a block 712.

As described above, embodiments provide overdraw images. Moreover, embodiments, provide the ability to enable or disable any user selected draw call to break down the composition of an overdraw image and more deeply examine the rendered pixels.

Overdraw images may contain subtle differences that are hard to visually identify. For example, one region may be slightly darker than a neighboring region (thus indicating a difference in the number of times the regions have been touched). Embodiments may visually enhance these differences. For example, at block 409 of FIG. 4, an overdraw image is enhanced.

Such enhancements may increase an overdraw image's dynamic range. As a result, subtle differences in the overdraw images become significantly easier to see. Various techniques may be employed to provide such increases in dynamic range. For instance, embodiments may employ clamping operations.

Figure 8:
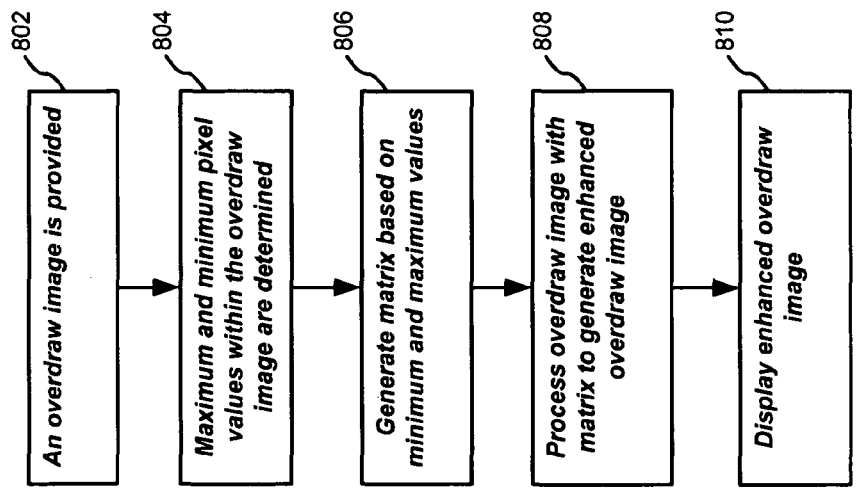

FIG. 8 illustrates a logic flow 800, which may be representative of operations executed by one or more embodiments. Although FIG. 8 shows a particular sequence, other sequences may be employed. Also, the depicted operations may be performed in various parallel and/or sequential combinations.

At a block 802, an overdraw image is provided. At a block 804, minimum and maximum values in the overdraw image are determined.

At a block 806, a matrix is generated based on the minimum and maximum values. The overdraw image is then processed with the matrix at a block 808. This processing produces an enhanced overdraw image, which may be displayed at a block 810.

An example of this technique is now provided. This example involves a 5×5 matrix. This is standard technique to perform linear operations on image data. Assuming that the pixel values are in the range [0, 255], and the matrix values are floating point scale factors, the following formula is employed:

$$\begin{bmatrix} Or \\ Og \\ Ob \\ Oa \\ 0 \end{bmatrix} = [Ir\ Ig\ Ib\ Ia\ 1] \begin{bmatrix} Mrr & Mrg & Mrb & Mra & 0 \\ Mgr & Mgb & Mgb & Mga & 0 \\ Mbr & Mbg & Mbb & Mba & 0 \\ Mar & Mag & Mab & Maa & 0 \\ Tlr & Tlg & Tlb & Tla & 1 \end{bmatrix}$$

This is a basic matrix multiply operation, where original RGBA image colors (Ir, Ig, Ib, Ia) are multiplied by the 5×5 matrix M to compute the adjusted RGBA image colors (Or, Og, Ob, Oa). By adjusting the values of the 20 variable elements of M, many color adjustment operations may be performed. In the case of overdraw images, the matrix values are adjusted to scale the overdraw image to expand the range of interesting data.

As an example, suppose every pixel in the entire render target was written to 20 times (suppose full render target quads were all blended on top of each other), and then suppose 3 more small triangles were written to the render target, two of which have some overlap. In this example, most pixels will have an overdraw of 20, a few will have overdraw of 21 (the ones that were touched by the small triangles), and a few will have an overdraw of 22 (the ones that were in intersection of the two small triangles that overlapped).

If a user viewed this image normally, it would look dark, and it would be extremely difficult to see the portions of the frame having overdraw values of 21 and 22. In this embodiment, view an adjusted image, where each of the pixels in the normal image get multiplied by the matrix M to compute the overdraw image adjusted colors. Here are the values used, assuming 8 bit color channels (each of the RGBA values in the original and overdraw images have values in [0, 255]), but this technique would not be limited to this case and would work if different color depths were used:

let min = 20 //the minimum value in the overdraw image let max = 22 //the maximum value in the overdraw image let delta ≤ (min − max)//negative delta if (delta = 0)

delta = −1; //ensure delta is non-zero let $s$ ≤ (−255/delta)/3; //scale let $t$ ≤ min/delta; //translate set $M$ to:

$$\begin{bmatrix} s & s & s & 0 & 0 \\ s & s & s & 0 & 0 \\ s & s & s & 0 & 0 \\ 0 & 0 & 0 & 0 & 0 \\ t & t & t & 1 & 1 \end{bmatrix}$$

Given this example, and following the matrix computation, there are three unique original values in the image:

$$\begin{bmatrix} 20/255 & 20/255 & 20/255 & 1 & 1 \\ 21/255 & 21/255 & 21/255 & 1 & 1 \\ 22/255 & 22/255 & 22/255 & 1 & 1 \end{bmatrix}$$

These go through the following transformations by the matrix multiply:

$$\begin{bmatrix} 20s/255 & +20s/255 & +20s/255 & +0+t \\ 20s/255 & +20s/255 & +20s/255 & +0+t \\ 20s/255 & +20s/255 & +20s/255 & +0+t \\ 0 & +0 & +0 & +0+1 \\ 0 & +0 & +0 & +0+1 \end{bmatrix} =$$

$$[20/255\ \ 20/255\ \ 20/255\ \ 1\ \ 1] \begin{bmatrix} s & s & s & 0 & 0 \\ s & s & s & 0 & 0 \\ s & s & s & 0 & 0 \\ 0 & 0 & 0 & 0 & 0 \\ t & t & t & 1 & 1 \end{bmatrix}$$

Since:

3*(20/255)s=3*(20/255)*((−255/−2)/3)=(20)*((1/2))
=10 t=20/−2=−10

Thus:

$$\begin{bmatrix} 0 \\ 0 \\ 0 \\ 1 \\ 1 \end{bmatrix} = [20/255\ \ 20/255\ \ 20/255\ \ 1\ \ 1] \begin{bmatrix} s & s & s & 0 & 0 \\ s & s & s & 0 & 0 \\ s & s & s & 0 & 0 \\ 0 & 0 & 0 & 0 & 0 \\ t & t & t & 1 & 1 \end{bmatrix}$$

For the middle (21) values, the following is performed:

3*(21/255)s=3*(21/255)*((−255/−2)/3)=(21)*((1/2))
=10.5 t=20/−2=−10

Accordingly:

$$\begin{bmatrix}0.5\\0.5\\0.5\\1\\1\end{bmatrix} = [\,21/255 \quad 21/255 \quad 21/255 \quad 1 \quad 1\,]\begin{bmatrix}s & s & s & 0 & 0\\s & s & s & 0 & 0\\s & s & s & 0 & 0\\0 & 0 & 0 & 0 & 0\\t & t & t & 1 & 1\end{bmatrix}$$

For the highest (22) values, the following is performed:

$$3*(22/255)s = 3*(22/255)*((-255/-2)/3) = (22)*((1/2))$$
$$= 11t = 20/-2 = -10$$

Thus:

$$\begin{bmatrix}1\\1\\1\\1\\1\end{bmatrix} = [\,22/255 \quad 22/255 \quad 22/255 \quad 1 \quad 1\,]\begin{bmatrix}s & s & s & 0 & 0\\s & s & s & 0 & 0\\s & s & s & 0 & 0\\0 & 0 & 0 & 0 & 0\\t & t & t & 1 & 1\end{bmatrix}$$

The above technique advantageously allows a small range of values to be expanded to a maximum range, so that visibility is maximized. This technique is provided for illustration, and not limitation. Accordingly, further techniques may be employed to increase the visibility of images.

Figure 10:
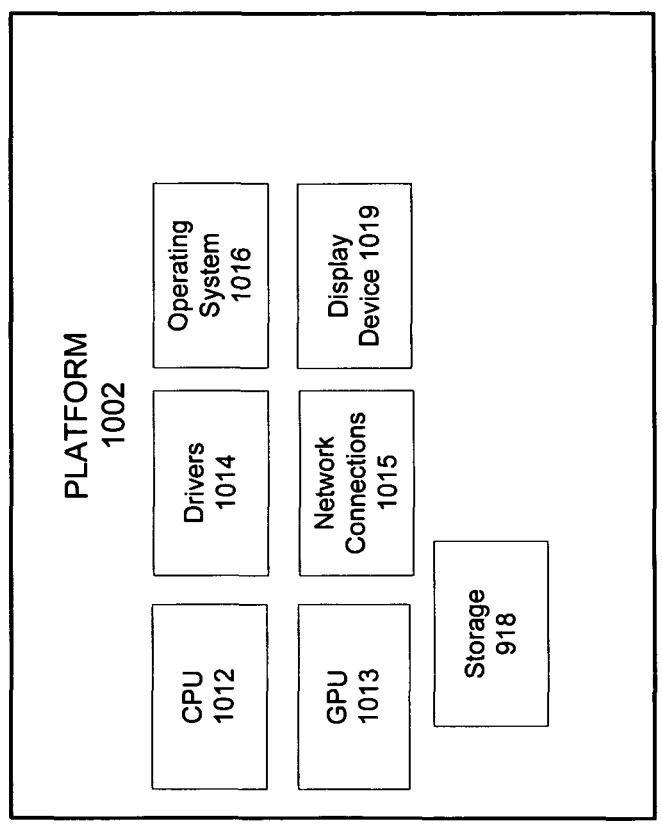
FIG. 10 is a diagram of an exemplary platform.

As described above, elements of embodiments (e.g., elements of FIGS. 1 and 2) may be implemented in any combination of hardware and/or software. Accordingly, FIG. 10 is a diagram of an exemplary platform 1002 in which functionality of the present invention as described herein may be implemented.

As described above, embodiments provide techniques for capturing frames. In addition, embodiments provide techniques for single stepping through graphics frames (e.g., a single graphics frame at a time) that are generated by an application. Such features advantageously allow an application's workload to be captured "on the fly", thus enabling an exact frame of interest to be captured.

In embodiments, such single stepping may be controlled by user interaction. For instance, a user may be provided with a pause button, a step button, and a capture button. Such buttons may be provided through a graphical user interface (e.g., interface console 300 of FIG. 3). Embodiments, however, are not limited to this context. Moreover, embodiments are not limited to the employment of graphical user interfaces.

The pause button feature allows the user to remotely pause an application (e.g., graphics application 102) at its current frame. In turn, the step button feature allows the user to single step forward exactly one frame. The capture button/feature that allows the user to decide to save the frame data (as well as its corresponding draw calls) for analysis.

Figure 9:
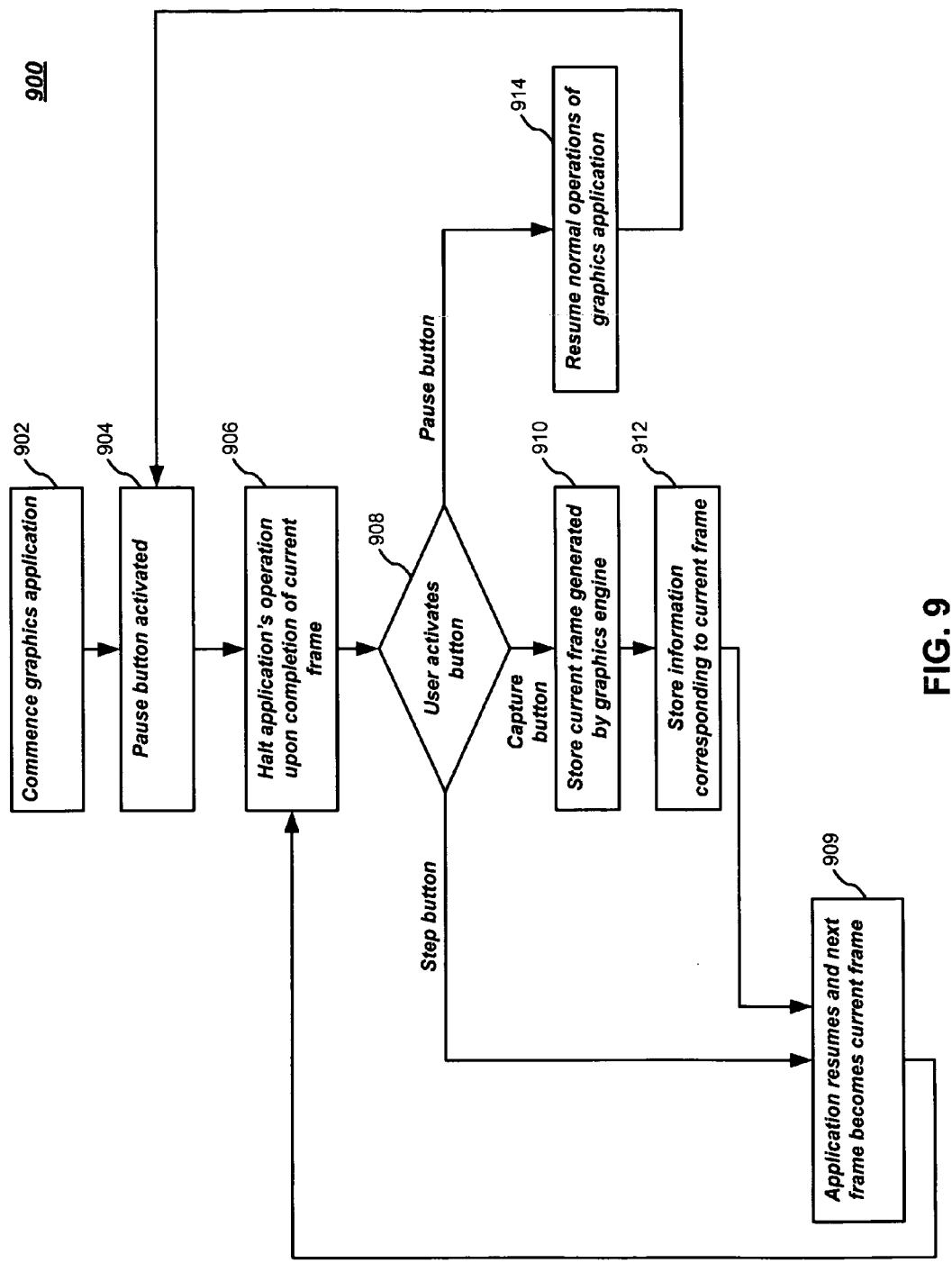

FIG. 9 illustrates a logic flow 900, which may be representative of operations involving such stepping and frame capturing features. This flow is described in the context of FIGS. 1 and 2. However, this flow may be employed in other contexts. Also, although FIG. 9 shows a particular sequence, other sequences may be employed. Also, the depicted operations may be performed in various parallel and/or sequential combinations.

At a block 902, a graphics application (e.g., a game) is commenced. For example, in the context of FIG. 1, this may comprise starting execution of graphics application 102.

At a block 904, the user activates a pause button. As a result, the graphics application halts operation upon the completion of its current frame at a block 906. This feature may involve graphics analysis tool 110 awaiting application 102 to make a "present call" (through graphics API 104). Such a call indicates that its draw calls for the current frame are complete and the current frame is ready for rendering by graphics engine 106. Once such a call is placed, then graphics analysis tool 110 may pause graphics application 102. This may be performed, for example, through one or more operating system calls. For instance, graphics analysis tool 110 may halt all running CPU software threads associated with the graphics application. Upon this pausing, the current frame may be displayed.

At a block 907, the user activates a button. If it is the step button, then operation proceeds to a block 909, where the graphics application is resumed and the next frame becomes the current frame. In the context of FIG. 1, this may involve graphics analysis tool 110 placing one or more operating system calls. Following this, operation returns to block 906 and the graphics application is again paused once it completes the frame.

However, if the user activates the capture button, the frame generated by the graphics engine (e.g., graphics engine 106) is stored at a block 910. With reference to FIG. 2, this may comprise storing the current frame's pixel data in frame storage module 212. Also, at a block 912, additional information related to the current frame is stored. Such information may include (but is not limited to) the draw calls corresponding to the current frame, state information—involving the graphics engine (e.g., pipeline state information), the graphics API, and/or the graphics application. Also, such information may include resources provided by application (e.g., world model information, vertex information, shading information, texture information, and so forth.). The embodiments are not limited to these examples. In the context of FIG. 2, some of such information may be intercepted and identified by graphics API draw call interceptor module 202 and stored in graphics API call log database 204.

FIG. 9 shows that following blocks 910 and 912, operation may proceed to block 909, where the graphics application is resumed, and the next frame becomes the current frame. Following this, operation returns to block 906, and the graphics application is again paused once it completes the frame.

As a further alternative, FIG. 9 shows that if the user activates the pause button, then normal operation of the graphics application is resumed at a block 914. In the context of FIG. 1, this may involve graphics analysis tool 110 placing one or more operating system calls. Following this, a block 916 indicates that operation may return to block 904 to perform further frame stepping and frame capture operations.

Thus, these frame stepping and frame capture techniques allow a user to have fine grained control over which exact frame to debug and profile. As a result, a user may find and fix bottlenecks, and/or remove redundant or insignificant graphics operations. The flow of FIG. 9 is described in the context of GUI buttons. This is for illustration and not limitation. Accordingly other user interaction techniques/devices may be employed. Thus embodiments may provide various user controls of various for the aforementioned pausing, stepping, capturing, and resuming features.

In embodiments, platform 1002 may comprise a CPU 1012, a GPU 1013, one or more drivers 1014, one or more network connections 1015, an operating system 1016, storage 1018, a display device 1019.

CPU 1012 may comprise one or more processors such as dual-core processors. Examples of dual-core processors include the Pentium® D processor and the Pentium® processor Extreme Edition both made by Intel® Corporation, which may be referred to as the Intel Core Duo® processors, for example.

GPU 1013 may comprise graphics various graphics processors, such as a peripheral component interconnect (PCI) Express graphics card. Embodiments, however, are not limited to this example. With reference to FIG. 1, GPU 1013 may provide features of graphics engine 106.

In one embodiment, network connections 1015 may comprise the PRO/1000 PM or PRO/100 VE/VM network connection, both made by Intel® Corporation.

In embodiments, operating system 1016 may comprise the Windows® XP Media Center made by Microsoft® Corporation. In further embodiments, operating system 1016 may comprise Linux®, as well as other types of operating systems.

In one embodiment, storage 1018 may comprise various tangible storage media. Such storage media may include data (e.g., images or frames) as well as instructions or control logic (e.g., software) to implement various features described herein (e.g., elements of FIGS. 1 and 2). Such instructions or control logic may be executed by CPU 1012 and/or GPU 1013. Examples of storage media are described further below.

Display device 1019 may output information to a user. In addition, display device 1019 may allow user interaction, as described herein. For instance, such user interaction may be through exemplary user interface 300.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a tangible machine-readable medium (storage medium) or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium (storage medium) or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method comprising:
selecting at least one render target having a sequence of graphics application program interface (API) draw calls;
creating an overdraw image based on the selected render target wherein the overdraw image represents for each pixel of a render target, a brightness corresponding to a number of times that each pixel has been written to;
after creating the overdraw image, generating a visually enhanced overdraw image using the previously created overdraw image by increasing a dynamic range within the previously created overdraw image, by expanding a small range of overdraw values to a larger range to increase visibility of differences within the small range, determining minimum and maximum values in the overdraw image, generating a matrix multiplier based on the determined minimum and maximum values, and processing the overdraw image using the matrix multiplier to generate the enhanced overdraw image; and
displaying the visually enhanced overdraw image.

2. The method of claim 1, further comprising storing the created overdraw image in a tangible storage medium.

3. The method of claim 1, further comprising storing the visually enhanced overdraw image in a tangible storage medium.

4. The method of claim 1, wherein selecting a render target comprises selecting a render target from a listing of multiple render targets.

5. The method of claim 1, further comprising:
selecting at least one pixel on the overdraw image;
selecting at least one draw call corresponding to the selected pixel; and
performing the selected at least one draw call to determine the number of times the selected at least one pixel was touched for the selected at least one draw call.

6. The method of claim 5, further comprising disabling at least one draw call of a render target before creating the overdraw image.

7. The method of claim 1, wherein generating a matrix multiplier includes adjusting values of the matrix multiplier to scale the overdraw image to expand the range of unique original values.

8. The method of claim 1, wherein increasing a dynamic range comprises expanding a small range of unique original brightness values to a maximum range.

9. The method of claim 1, wherein increasing a dynamic range comprises employing clamping operations.

10. An apparatus, comprising:
 a graphics application program interface (API);
 a graphics engine to sort the graphics API draw call into sequences for each of multiple render targets, the graphics engine maintaining a plurality of buffers each corresponding to a render target; and
 a graphics analysis tool to receive a selection of at least one render target having a sequence of graphics API calls, create an overdraw image based on the selected render target, wherein the overdraw image represents for each pixel of a render target, a brightness corresponding to a number of times that each pixel has been written to, generate a visually enhanced overdraw image using the previously created overdraw image after creating the overdraw image by increasing a dynamic range within the previously created overdraw image; and
 the graphics engine further to display the visually enhanced overdraw image,
 wherein the graphics tool is further to generate the visually enhanced overdraw image by expanding a small range of overdraw values to a larger range to increase visibility of differences within the small range by determining minimum and maximum values in the overdraw image, generating a matrix multiplier based on the determined minimum and maximum values, and processing the overdraw image using the matrix multiplier to generate the enhanced overdraw image.

11. The apparatus of claim 10, wherein the graphics engine comprises a graphics processing unit (GPU).

12. The apparatus of claim 10, further comprising a display device, the graphics analysis tool to display the visually enhanced overdrawn image on the display device.

13. The apparatus of claim 10, further comprising a tangible storage medium to store the visually enhanced overdraw image.

14. The apparatus of claim 10, wherein the graphics analysis tool is further to increase the dynamic range by expanding a small range of unique original brightness values to a maximum range.

15. An article comprising a non-transitory machine-readable medium having stored thereon instructions that, when executed by a machine, cause the machine to:
 select at least one render target having a sequence of graphics application program interface (API) draw calls;
 create an overdraw image based on the selected render target wherein the overdraw image represents for each pixel of a render target, a brightness corresponding to a number of times that each pixel has been written to,
 after creating the overdraw image, generate a visually enhanced overdraw image using the previously created overdraw image by increasing a dynamic range within the previously created overdraw image;
 expand a small range of overdraw values to a larger range to increase visibility of differences within the small range by determining minimum and maximum values in the overdraw image, generating a matrix multiplier based on the determined minimum and maximum values, and processing the overdraw image using the matrix multiplier to generate the enhanced overdraw image; and
 display the visually enhanced overdraw image.

16. The article of claim 15, wherein to generate a visually enhanced overdraw image the machine being further caused to:
 determine minimum and maximum values in the overdraw image;
 generate a matrix multiplier based on the determined minimum and maximum values; and
 process the overdraw image using the matrix multiplier to generate the enhanced overdraw image.

17. The article of claim 15, the machine being further caused to:
 select at least one pixel on the overdraw image;
 select at least one draw call corresponding to the selected pixel; and
 perform the selected at least one draw call to determine the number of times the selected at least one pixel was touched for the selected at least one draw call.

18. The article of claim 16, wherein to generate a matrix multiplier the matrix multiplier values are adjusted to scale the overdraw image to expand the range of unique original values.

* * * * *